(12) United States Patent
Boden et al.

(10) Patent No.: US 9,357,215 B2
(45) Date of Patent: May 31, 2016

(54) AUDIO OUTPUT DISTRIBUTION

(71) Applicants: Michael Boden, Atlanta, GA (US); Scott D. Boden, Atlanta, GA (US)

(72) Inventors: Michael Boden, Atlanta, GA (US); Scott D. Boden, Atlanta, GA (US)

( * ) Notice: Subject to any disclaimer, the term of this patent is extended or adjusted under 35 U.S.C. 154(b) by 291 days.

(21) Appl. No.: 13/764,831

(22) Filed: Feb. 12, 2013

(65) Prior Publication Data

US 2013/0155318 A1 Jun. 20, 2013

(51) Int. Cl.
| | |
|---|---|
| *H04N 7/26* | (2006.01) |
| *H04N 19/90* | (2014.01) |
| *H04N 21/43* | (2011.01) |
| *H04N 21/63* | (2011.01) |
| *H04N 21/658* | (2011.01) |
| *H04N 21/81* | (2011.01) |

(52) U.S. Cl.
CPC ..... *H04N 19/00945* (2013.01); *H04N 21/4307* (2013.01); *H04N 21/631* (2013.01); *H04N 21/6581* (2013.01); *H04N 21/8106* (2013.01)

(58) Field of Classification Search
CPC .......... H04N 19/00945; H04N 21/631; H04N 21/6581; H04N 21/8106; H04N 21/4307
USPC .............. 341/51; 348/425.4, 469, 515, 14.08, 348/705; 370/240.26, 259, 261, 328, 345, 370/401, 433; 381/79, 22; 382/176; 455/3.06, 214, 550.1, 414.3; 700/94; 704/201, 500, 229; 709/219, 204; 725/39, 109, 116, 143; 352/40; 386/241; 375/240.26, 259; 379/87; 713/171
See application file for complete search history.

(56) References Cited

U.S. PATENT DOCUMENTS

| | | | | |
|---|---|---|---|---|
| 4,710,917 A | * | 12/1987 | Tompkins | H04Q 11/04 348/14.08 |
| 5,060,068 A | * | 10/1991 | Lindstrom | 725/32 |
| 5,822,306 A | * | 10/1998 | Catchpole | 370/261 |
| 5,912,894 A | * | 6/1999 | Duault | H04L 12/5695 370/433 |
| 6,249,324 B1 | * | 6/2001 | Sato | G06T 9/005 348/14.08 |
| 6,421,706 B1 | * | 7/2002 | McNeill | G06Q 10/10 709/204 |
| 6,434,125 B1 | * | 8/2002 | Marks | H04N 1/00103 358/434 |
| 6,580,694 B1 | | 6/2003 | Baker | |
| 6,654,718 B1 | * | 11/2003 | Maeda | G10L 19/18 704/219 |
| 6,711,622 B1 | | 3/2004 | Fuller et al. | |
| 6,732,183 B1 | | 5/2004 | Graham | |
| 6,873,625 B1 | | 3/2005 | Yoo et al. | |

(Continued)

FOREIGN PATENT DOCUMENTS

| | | |
|---|---|---|
| EP | 2255511 | 1/2009 |
| EP | 2465114 | 8/2010 |

OTHER PUBLICATIONS

International Search Report with Written Opinion dated May 22, 2014 cited in Application No. PCT/US2014/015966, 10 pgs.

*Primary Examiner* — Gerald Gauthier
(74) *Attorney, Agent, or Firm* — Merchant & Gould (57) ABSTRACT

In some embodiments, a request for an audio stream associated with a video output may be received. Upon receiving the request, the requested audio stream may be encoded for transmission over a network and sent to a user device associated with the request.

26 Claims, 5 Drawing Sheets

(56) References Cited

U.S. PATENT DOCUMENTS

| | | | |
|---|---|---|---|
| 6,889,385 B1 * | 5/2005 | Rakib | G08B 13/19656 348/E7.069 |
| 6,898,313 B2 * | 5/2005 | Li et al. | 382/176 |
| 6,903,780 B2 * | 6/2005 | Mair et al. | 348/469 |
| 6,972,829 B2 * | 12/2005 | McCormick et al. | 352/40 |
| 6,993,139 B2 * | 1/2006 | Hara | 381/22 |
| 7,006,806 B2 * | 2/2006 | Wu et al. | 455/214 |
| 7,149,469 B2 | 12/2006 | Russell | |
| 7,200,644 B1 * | 4/2007 | Flanagan | 709/219 |
| 7,275,256 B1 * | 9/2007 | Del Beccaro et al. | 725/143 |
| 7,286,601 B2 * | 10/2007 | Kitamura | 375/259 |
| 7,295,247 B2 * | 11/2007 | Bang | 348/515 |
| 7,310,680 B1 | 12/2007 | Graham | |
| 7,325,066 B1 | 1/2008 | Fuller et al. | |
| 7,328,160 B2 * | 2/2008 | Nishio et al. | 704/500 |
| 7,430,665 B2 * | 9/2008 | DiSanto | H04K 1/00 713/168 |
| 7,443,807 B2 * | 10/2008 | Cutler | H04L 29/06027 370/254 |
| 7,555,354 B2 * | 6/2009 | Walsh et al. | 700/94 |
| 7,706,901 B2 | 4/2010 | Berreth | |
| 7,996,040 B1 | 8/2011 | Timm | |
| 8,005,344 B2 * | 8/2011 | Watkins | 386/241 |
| 8,078,302 B2 | 12/2011 | Berreth | |
| 8,085,906 B2 * | 12/2011 | Park | H04M 3/42017 370/259 |
| 8,166,503 B1 | 4/2012 | Rosenberg et al. | 725/39 |
| 8,284,082 B2 * | 10/2012 | Rao et al. | 341/51 |
| 8,290,173 B2 * | 10/2012 | Richenstein et al. | 381/79 |
| 8,315,724 B2 | 11/2012 | Rice, Jr. | |
| 8,743,284 B2 * | 6/2014 | Russell et al. | 348/515 |
| 8,811,416 B2 * | 8/2014 | Ozawa | H04M 7/0072 370/401 |
| 8,831,577 B2 * | 9/2014 | Ginn et al. | 455/414.3 |
| 2003/0005138 A1 | 1/2003 | Giffin et al. | |
| 2003/0164899 A1 | 9/2003 | Lee | |
| 2004/0030929 A1 * | 2/2004 | Bi et al. | 713/201 |
| 2004/0127201 A1 | 7/2004 | Takayama et al. | |
| 2004/0254659 A1 | 12/2004 | Bolas et al. | |
| 2005/0170859 A1 * | 8/2005 | Koike et al. | 455/550.1 |
| 2006/0039482 A1 * | 2/2006 | Cho | 375/240.26 |
| 2006/0140265 A1 | 6/2006 | Igler et al. | |
| 2006/0149400 A1 | 7/2006 | Choi et al. | |
| 2007/0283033 A1 | 12/2007 | Bloebaum et al. | |
| 2008/0178237 A1 * | 7/2008 | Hashimoto | 725/109 |
| 2008/0273078 A1 * | 11/2008 | Grasley et al. | 348/14.08 |
| 2009/0129363 A1 * | 5/2009 | Lindsey et al. | 370/345 |
| 2009/0318077 A1 * | 12/2009 | Ghahramani | 455/3.06 |
| 2010/0058422 A1 * | 3/2010 | Ochiai et al. | 725/116 |
| 2010/0241434 A1 * | 9/2010 | Ono | 704/500 |
| 2010/0260348 A1 | 10/2010 | Bhow et al. | |
| 2010/0292821 A1 | 11/2010 | Mehta | |
| 2011/0296484 A1 | 12/2011 | Harres et al. | |
| 2012/0158408 A1 | 6/2012 | McGowan | |
| 2012/0200774 A1 * | 8/2012 | Ehlers, Sr. | 348/515 |
| 2013/0007831 A1 * | 1/2013 | Wu | H04N 21/23655 725/116 |
| 2013/0155318 A1 * | 6/2013 | Boden et al. | 348/425.4 |
| 2014/0052438 A1 * | 2/2014 | Yerrace et al. | 704/201 |
| 2014/0064152 A1 * | 3/2014 | Li et al. | 370/259 |
| 2014/0067381 A1 * | 3/2014 | Li et al. | 704/201 |

\* cited by examiner

AUDIO OUTPUT DISTRIBUTION

BACKGROUND

In some situations, users may wish to listen to audio associated with a video stream without using a conventional set of speakers. For example, a person watching television in a hotel room where someone else wants to sleep may want to hear the television program over headphones. In conventional situations, most televisions do not have the appropriate audio ports for headphones, however. For another example, multiple videos may be available, such as on multiple televisions showing different games at a sports bar. Trying to play the audio for all of the games over conventional speakers would merely result in a confusing din. Thus, a solution is needed that allows for listeners to hear audio streams without the sound being emitted from traditional speakers.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Consistent with embodiments of the present disclosure, systems and methods are disclosed for providing audio output distribution.

In some embodiments, a request for an audio stream associated with a video output may be received. Upon receiving the request, the requested audio stream may be encoded for transmission over a network and sent to a user device associated with the request.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Devices, methods, and algorithms for converting the audio output of a multimedia device (television, stereo, mp3 player, etc.) into a streaming audio signal are provided. Protocols, such as Voice over IP (VoIP) may be used to transmit audio for receipt by electronic devices such as mobile telephones, smartphones, personal data assistants (PDAs), tablets, laptops, mp3 players, and/or other devices that have wireless radios. Such converting devices may be small enough for travel and personal use and/or may be arranged for commercial applications that receive multiple audio inputs and make them network-accessible for multiple receiving devices.

Figure 1:
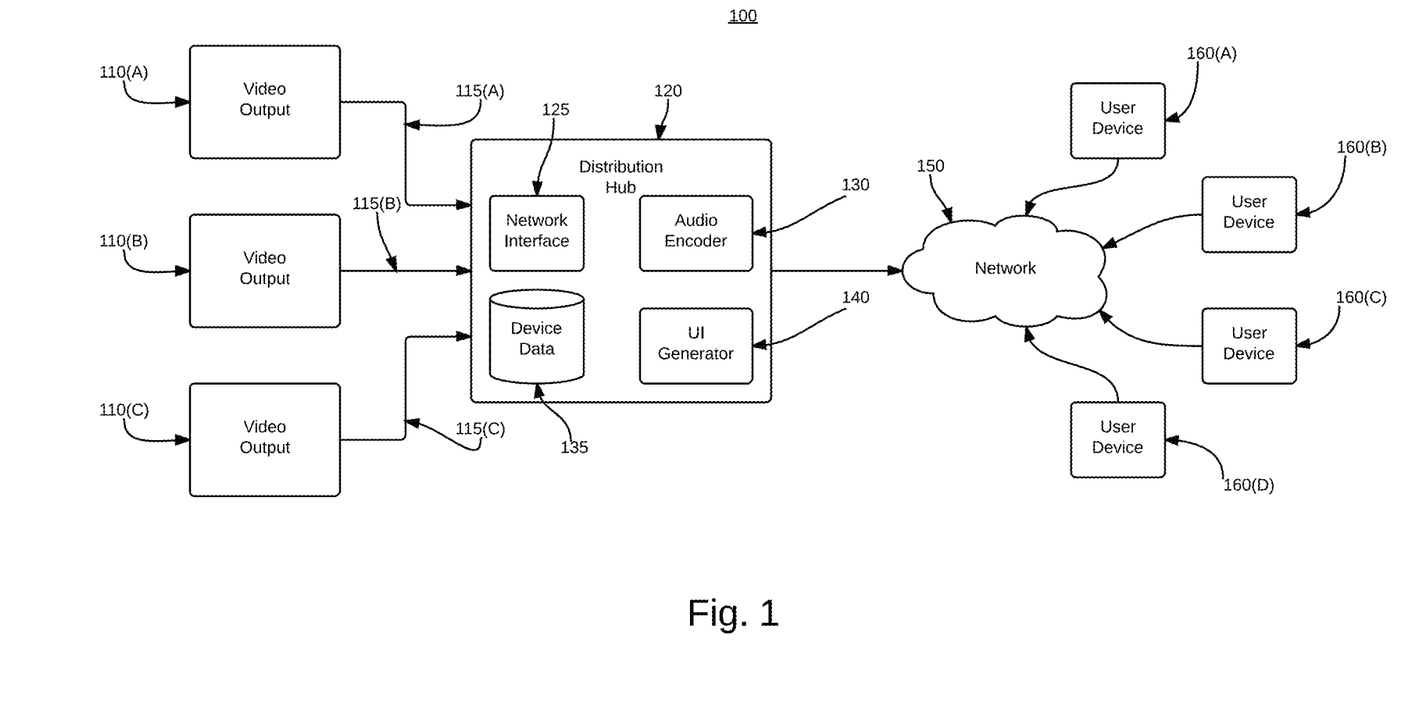
FIG. 1 is a block diagram of an operating environment.

FIG. 1 is a block diagram of an operating environment 100. Operating environment 100 may comprise a plurality of video output devices 110(A)-(C), such as televisions, closed circuit monitors, computer screens, etc. Each of the plurality of video output devices 110(A)-(C) may be associated with a respective audio stream 115(A)-(C) that may be input into a distribution hub 120. Respective audio streams 115(A)-(C) may comprise analog and/or digital audio outputs from video output devices 110(A)-(C) and/or may be communicated from a separate source, such as an amplifier (not shown), coupled to one and/or more of the video output devices 110(A)-(C). Respective audio streams 115(A)-(C) may be provided via audio inputs such as 3.5 mm/headphone, digital, optical, analog, RCA, and/or HDMI ports.

In some embodiments, one and/or more of the video output devices 110(A)-(C) may be associated with multiple audio streams. For example, video output device 110(A) may be associated with two audio output streams in different languages, such as one in English and one in Spanish. The audio output streams may be synchronized with the video being displayed on video output device 110(A). For another example, video output device 110(B) may be associated with audio output streams from different sources, such as audio commentary associated with each team participating in a sports event being displayed on video output device 110(B).

Distribution hub 120 may comprise components such as a network interface 125, an audio encoder 130, a device database 135, and/or a user interface (UI) generator 140. In some embodiments, distribution hub 120 may comprise a computing device 400, as described in greater detail below with respect to FIG. 4. In some embodiments, distribution hub 120 may comprise an electronic apparatus operative to execute embedded software, such as a Linux kernel, that controls the components.

Network interface 125 may comprise one and/or more networking components operative to communicate wirelessly with other devices via a network 150. For example, network interface 125 may comprise an 802.11 standard compliant wireless card configured to join an existing wireless network and/or to create an ad-hoc wireless network. For other examples, network interface 125 may comprise a radio-frequency identifier (RFID) component, a Bluetooth component, and/or a Near-Field Communications (NFC) component.

Audio encoder 130 may comprise a component operative to convert respective audio streams 115(A)-(C) into a format suitable for transmission over network 150. For example, audio encoder 130 may transcode inputs from respective audio streams 115(A)-(C) into a lower bitrate format that may be more efficiently transmitted over a wireless network. In some embodiments, audio encoder 130 may be operative to provide for the broadcast, multicast, or unicast of respective audio streams 115(A)-(C) over network 150, such as by encoding the transmitted audio in a format that supports addressing of the data packets to one and/or more of a plurality of user devices 160(A)-(D) coupled to network 150.

Plurality of user devices 160(A)-(D) may select one and/or more of respective audio streams 115(A)-(C) to receive via a UI provided by the UI generator 140 of distribution hub 120. Each of user devices 160(A)-(D) may be associated with a unique identifier, such as a MAC address. These identifiers and selections may be stored in device database 135 and used in the addressing of data packets in multicast and/or unicast transmission embodiments.

In some embodiments, user devices 160(A)-(D) may comprise personal electronic devices such as smartphones, mp3 players, tablet, laptop computers, etc. User devices 160(A)-(D) may also comprise dedicated devices operative to select audio streams to receive from distribution hub 120 via network 150 and provide wired and/or wireless outputs of those audio streams. For example, a dedicated network appliance may be available at each table in a sports bar. Patrons at each table may select one and/or more audio streams to be received by the appliance, and may then plug in headphones to audio ports on the appliance, receive a wireless transmission from the appliance to their personal audio playback devices, and/or listen to the audio stream via speakers integrated into or connected to the appliance.

Figure 2A:
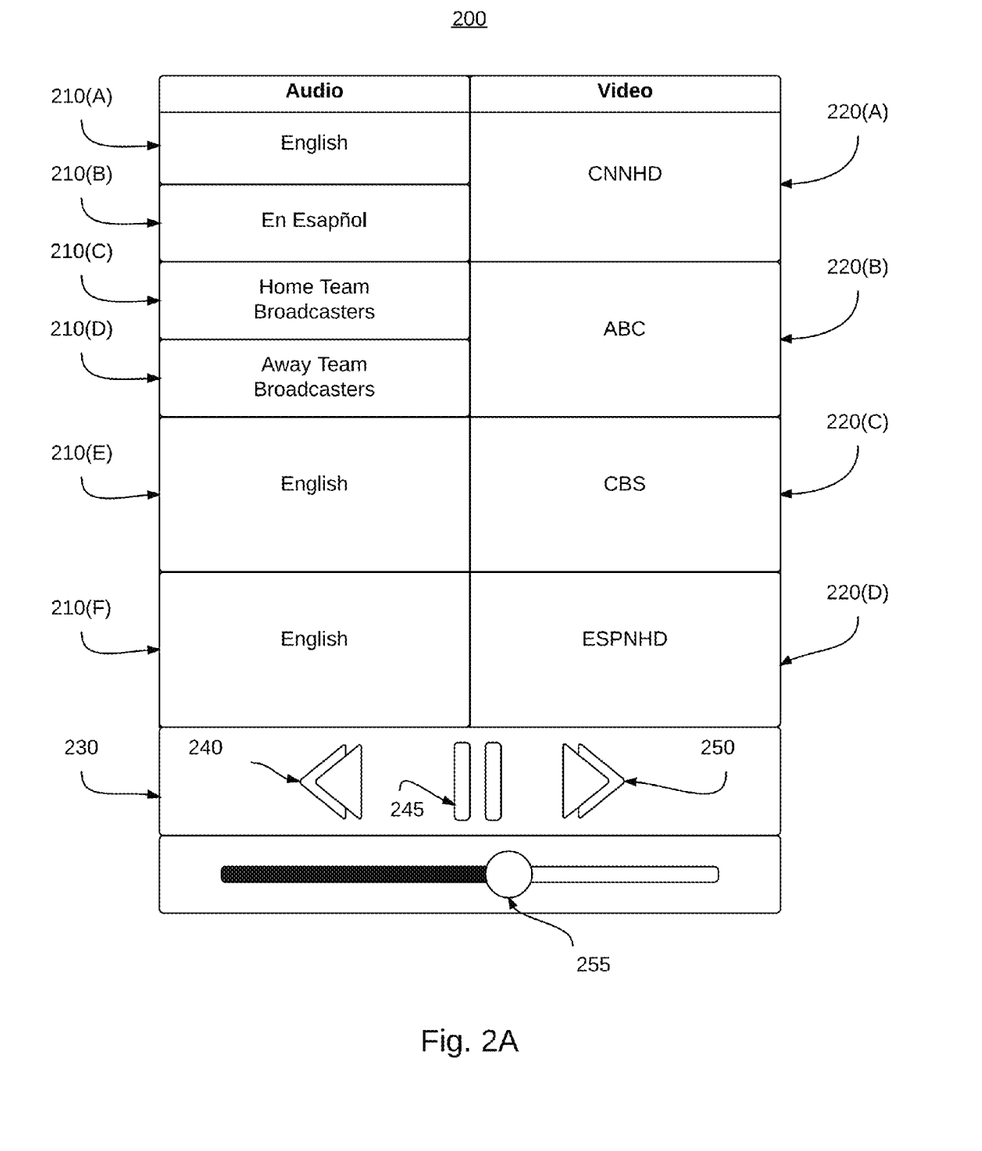
FIGS. 2A-2B are block diagrams of a user interface for selecting an audio output.

FIG. 2A is a block diagram of an example user interface 200 for selecting an audio output. In at least some embodiments, user interface 200 may comprise a web page generated by distribution hub 120. User interface 200 may comprise a plurality of available audio streams 210(A)-(F) displayed in association with a plurality of video programs 220(A)-(D). When available, multiple audio streams may be associated with a single video stream. User interface 200 may be displayed on one and/or more of user devices 160(A)-(D) and may be operative to receive a selection of one and/or more of available audio streams 210(A)-(F), such as via a touchscreen, stylus, keyboard, and/or voice recognition input. The labels for available audio streams 210(A)-(F) and/or video streams 220(A)-(D) may be generated, for example, from manually input data and/or detected from metadata associated with respective audio streams 115(A)-(C). User interface 200 may further comprise a plurality of playback controls 230, such as a rewind control 240, a pause control 245, and/or a fast forward control 250 that enable a user to control and/or change playback position within an audio stream. User interface 200 may further comprise a volume control 255 for adjusting the output volume of the selected audio stream.

Figure 2B:
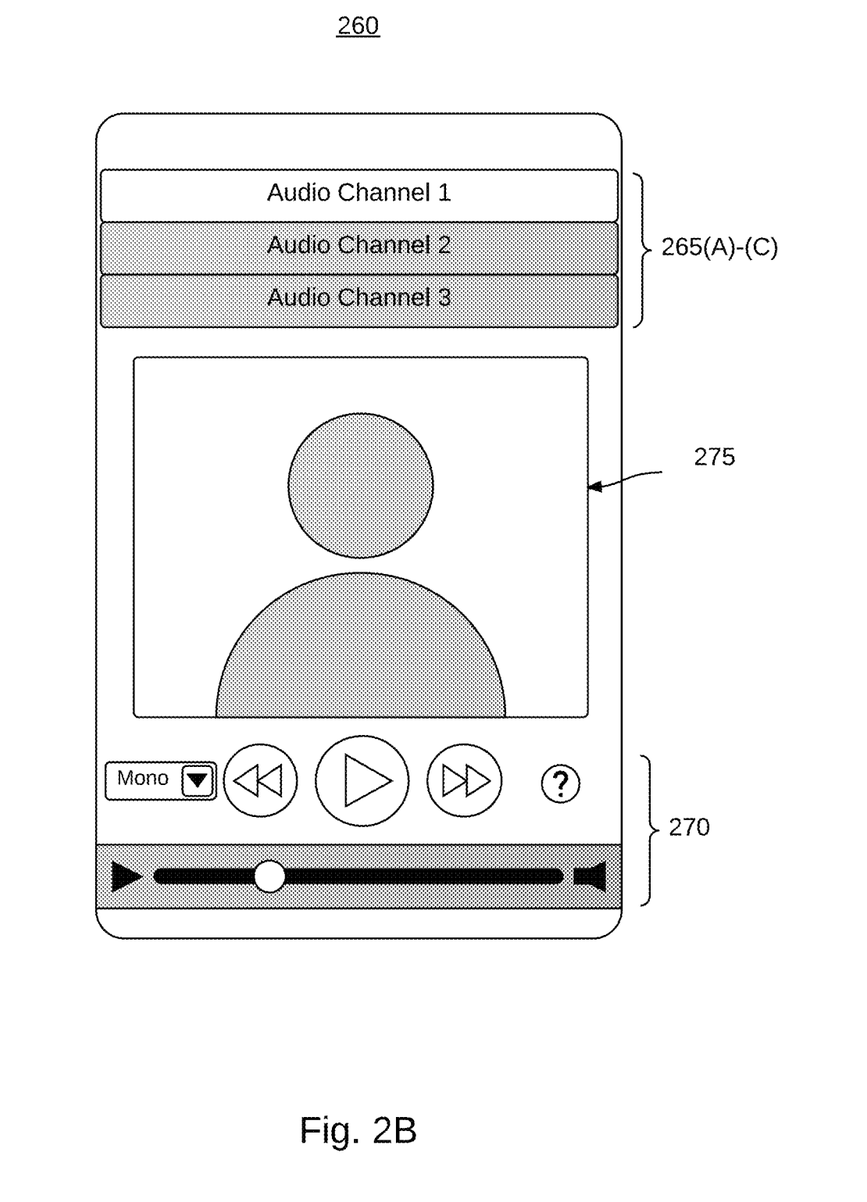

FIG. 2B is a second example user interface (UI) 260 for selecting an audio output. Second example UI 260 may comprise a second plurality of available audio streams 265(A)-(C) and a second plurality of user interface controls 270. Second example UI may further comprise a display area 275 for displaying additional information and/or content. For example, display area 275 may display the video stream associated with a selected one of second plurality of available audio streams 265(A)-(C). Such a video stream may be synchronized to the audio stream and the playback position of the video stream may be changed using the second plurality of user interface controls 270. Display area 275 may also be used to display other content, such as output from another application executing on the user's device, such that second example UI 260 operates as an overlay to the other application. Display area 275 may also be used to display images and/or animations, such as a logo for the provider of the audio stream (e.g., a restaurant or waiting room) and/or advertisements. For example, display area 275 may display dining specials available at a restaurant where the embodiments disclosed herein are in operation and/or ads related to the content of the audio stream.

Figure 3:
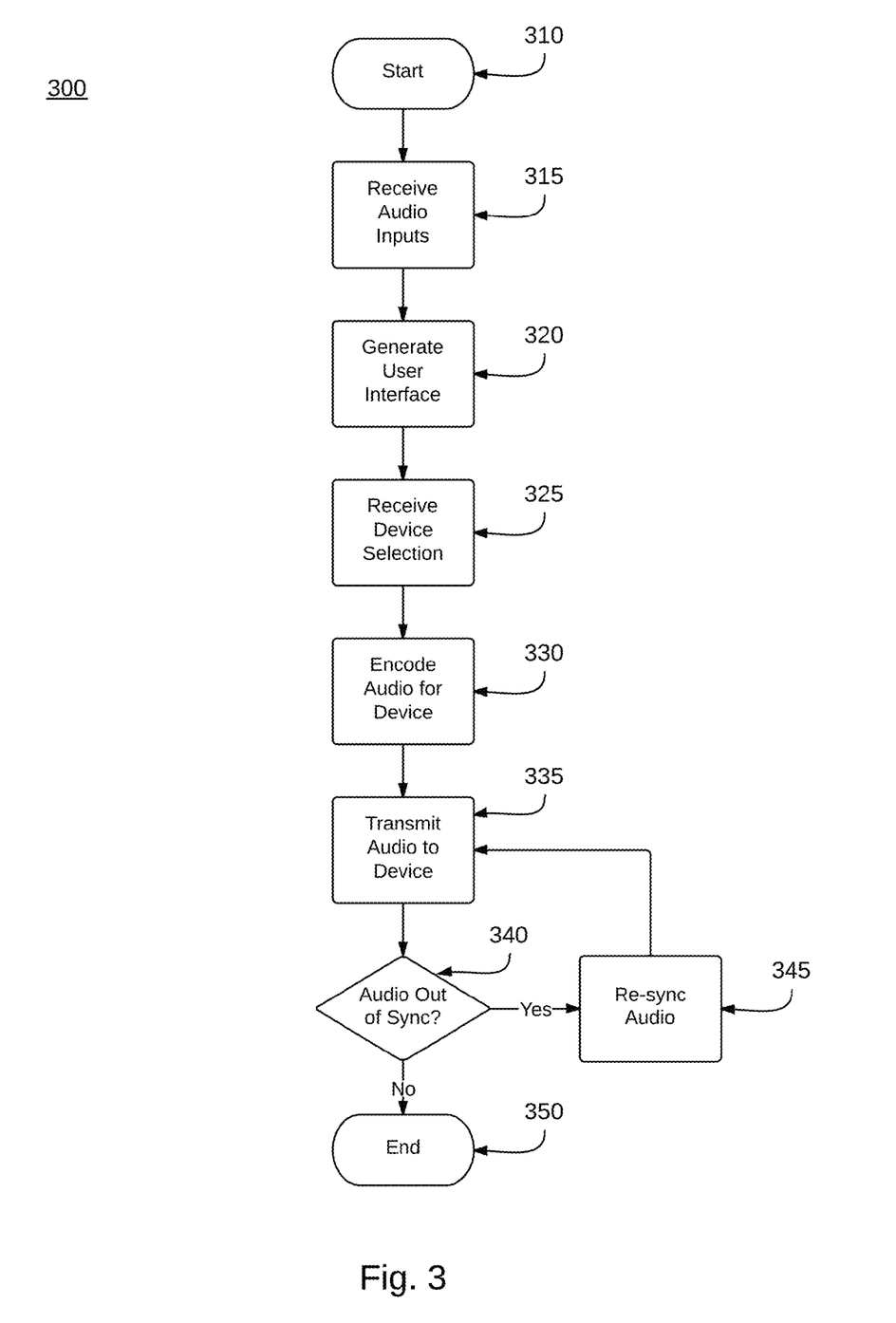
FIG. 3 is a flow chart illustrating a method for providing distributed audio output.
Figure 4:
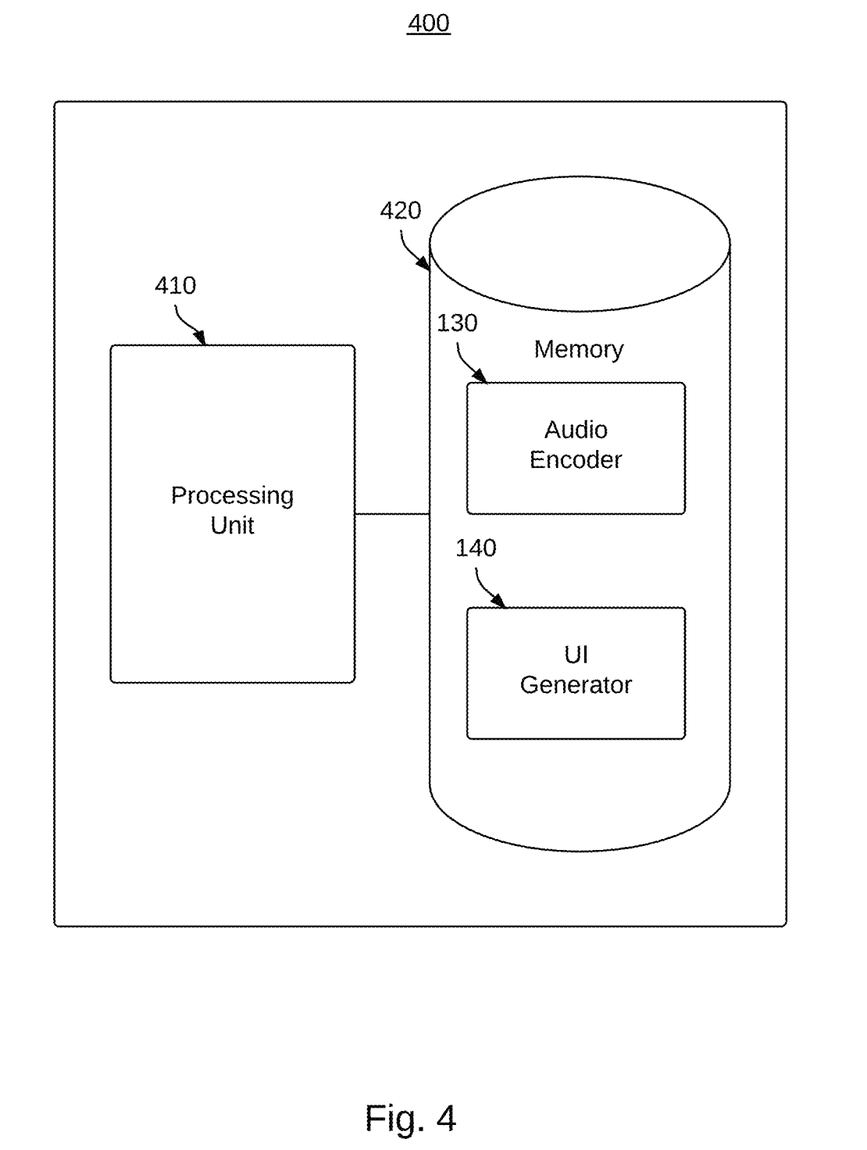
FIG. 4 is a block diagram illustrating components of a computing device.

FIG. 3 illustrates a flow chart setting forth the general stages involved in a method 300 for providing distributed audio output. Method 300 may be implemented using the components illustrated in operating environment 100 as described above. Ways to implement the stages of method 300 will be described in greater detail below. Method 300 may begin at starting block 310 and proceed to stage 315 where computing device 400 may receive a plurality of audio inputs. For example, distribution hub 120 may be coupled to the audio outputs of a plurality of video output devices, such as televisions.

Method 300 may then advance to stage 320 where computing device 400 may generate a user interface. For example, distribution hub 120 may generate user interface 200 and make it available to other devices communicating over network 150.

Method 300 may then advance to stage 325 where computing device 400 may receive a selection of one of the audio inputs from a user device. For example, user device 160(A) may select the "English" language audio stream 210(A) associated with the CNNHD video stream 220(A) via user interface 200.

Method 300 may then advance to stage 330 where computing device 400 may encode the selected audio input for the requesting user device. For example, distribution hub 120 may encode audio stream 210(A) for broadcast over network 150 and/or may encapsulate the audio stream in data packets addressed to the requesting user device, such as for a multicast or unicast transmission algorithm. Consistent with embodiments of this disclosure, distribution hub 120 may select an encoding according to compatible formats of the requesting user device and/or according to available transmission bandwidth over network 150.

Method 300 may then advance to stage 335 where computing device 400 may transmit the encoded audio stream to the requesting user device. For example, distribution hub 120 may transmit the audio stream over network 150 to one and/or more of user devices 160(A)-(D).

Method 300 may then advance to stage 340 where computing device 400 may determine whether the encoded audio stream is out of sync with the associated video. Consistent with embodiments of this disclosure, such a determination may occur on a periodic basis, such as every 30 seconds. The determination may comprise, for example, comparing a timestamp associated with the video stream's position with a current playback position of the audio stream on the requesting device.

If the audio and video are determined to be out of sync at stage 340, method 300 may advance to stage 345 where computing device 400 may re-sync the audio and video streams. For example, distribution hub 120 may skip the transmission of a portion of the audio stream to bring the current playback position of the audio stream into sync with the current playback position of the video stream. Once the audio and video streams are in sync, method 300 may end at stage 350.

FIG. 4 illustrates computing device 400 comprising a processing unit 410 and a memory 420. Memory 420 may include, for example, audio encoder 130 and/or UI generator 140. While executing on processing unit 410, these and other software modules and/or data sources may perform processes for providing redundancy elimination in web caching, for example, via one or more stages included in method 300 described above with respect to FIG. 3. Moreover, any one or more of the stages included in method 300 may be performed on any element shown in operating environment 100 and each of the elements illustrated in operating environment 100 may comprise a similar computing device to that illustrated by FIG. 4.

Computing device 400 may be implemented using an embedded device, a personal computer, a network computer, a mainframe, or other similar microcomputer-based worksta­tion. The processor may comprise any computer operating environment, such as hand-held devices, multiprocessor sys­tems, microprocessor-based or programmable sender elec­tronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conven­tional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclo­sure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as sec­ondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the disclosure.

While the specification includes examples, the disclosure's scope is indicated by the following claims. Furthermore, while the specification has been described in language spe­cific to structural features and/or methodological acts, the claims are not limited to the features or acts described above. Rather, the specific features and acts described above are disclosed as example for embodiments of the disclosure.

What is claimed is:

1. A method for providing audio output distribution, the method comprising:
receiving a request for at least one audio stream, wherein the audio stream is communicated from a video display output device comprising an audio input port;
encoding the requested at least one audio stream for trans­mission over a network after the audio stream has been communicated from the audio input port of the video display output device; and
transmitting the encoded at least one audio stream over the network to a user device associated with the request.

2. The method of claim 1, wherein the encoded at least one audio stream is provided to the user device in sync with the video output.

3. The method of claim 2, wherein the at least one audio stream comprises one of a plurality of audio streams, wherein each of the plurality of audio streams are associated with one of a plurality of television programs.

4. The method of claim 1, wherein the at least one audio stream comprises one of a plurality of alternate audio streams associated with the video output.

5. The method of claim 1, wherein the request for the at least one audio stream comprises an identifier associated with a requesting device.

6. The method of claim 5, wherein encoding the requested at least one audio stream for transmission comprises address­ing the encoded at least one audio stream according to the identifier associated with the requesting device.

7. The method of claim 1, further comprising:
periodically resyncing the at least one audio stream with a current position of the video output.

8. The method of claim 1, wherein the audio stream is communicated from a video display output device through analog audio outputs.

9. The method of claim 8, wherein the requested at least one audio stream is encoded into a digital audio output for transmission over the network.

10. An apparatus for distributing an audio stream from a video display output device comprising an audio input port, the apparatus comprising:
an audio input connector in communication with the audio input port of the video display output device;
a network transceiver in communication with the audio input connector; and
a processor, wherein the processor is configured to:
receive an audio stream from the audio input port of the video display output device via the audio input con­nector,
encode the audio stream for transmission, and
transmit the encoded stream to at least one receiver.

11. The apparatus of claim 10, wherein the processor is further configured to:
receive a request from at least one second receiver to join the audio stream; and
transmit the encoded stream to the at least one receiver and the at least one second receiver.

12. The apparatus of claim 11, wherein the processor is further configured to:
encode a video stream associated with the audio stream; and
transmit the encoded video stream to the at least one receiver.

13. The apparatus of claim 10, wherein the processor is further configured to create a wireless network associated with the network transceiver.

14. The apparatus of claim 13, wherein the processor is further configured to transmit the encoded audio stream over the created wireless network.

15. The apparatus of claim 14, where the created wireless network comprises an ad-hoc wireless network in accordance with the 802.11 specification.

16. The apparatus of claim 10, wherein the audio input connector is in analog communication with the video display output device and the network transceiver is in analog com­munication with the audio input connector.

17. The apparatus of claim 16, wherein the processor is configured to:
receive the analog audio stream via the audio input con­nector,
encode the audio stream for digital transmission, and transmit the digitally encoded stream to at least one receiver.

18. A system for distributing a plurality of audio streams from at least one video display output devices comprising an audio input port, the system comprising:
a memory storage; and
a processor coupled to the memory storage, wherein the processor is configured to:
encode each of a plurality of audio streams, wherein each of the plurality of audio streams are communicated from the audio input port of the at least one video display output devices,
generate a listing interface of the plurality of encoded audio streams,
receive a request for at least one of the encoded audio streams, and
transmit the at least one encoded audio stream over a communications medium.

19. The system of claim 18, wherein being configured to transmit the at least one encoded audio stream over the communications medium comprises being configured to multicast the at least one encoded audio stream over the communications medium to a plurality of user devices.

20. The system of claim 18, wherein being configured to transmit the at least one encoded audio stream over the communications medium comprises being configured to unicast the at least one encoded audio stream over the communications medium to a subscribed user device.

21. The system of claim 18, wherein being configured to generate the listing interface of the plurality of encoded audio streams comprises being configured to generate a web page accessible over the communications medium.

22. The system of claim 18, wherein the received request comprises a plurality of user information associated with a user device.

23. The system of claim 22, wherein the plurality of user information comprises a user preference.

24. The system of claim 22, wherein the plurality of user information comprises a user subscription.

25. The system of claim 18, wherein the plurality of audio streams are communicated through analog output from the at least one video display output devices.

26. The system of claim 25, wherein the plurality of audio streams are encoded into a digital audio output for transmission over the communications medium.

* * * * *